Aug. 24, 1965   J. A. BARR, JR., ETAL   3,202,365
PHOSPHATE RECOVERY APPARATUS
Filed April 9, 1962                                     2 Sheets-Sheet 1

INVENTORS
JAMES A. BARR, JR.
CHARLES H. GREENE
CLARENCE G. OLSEN
BY
ATTORNEY

United States Patent Office 3,202,365
Patented Aug. 24, 1965

3,202,365
PHOSPHATE RECOVERY APPARATUS
James A. Barr, Jr., Washington, D.C., and Charles H. Greene and Clarence G. Olsen, Lakeland, Fla., assignors, by mesne assignments, to Chemical Cleaning, Inc., New Orleans, La., a corporation of Louisiana
Filed Apr. 9, 1962, Ser. No. 186,605
7 Claims. (Cl. 241—42)

The present invention relates to the beneficiation of phosphate ores, and more specifically to a novel apparatus for separating valuable phosphatic material from the clay and sand contained in a naturally occurring phosphate ore.

Phosphate ore as it is mined from the earth is sometimes defined as a matrix which comprises pieces of phosphate rock and silica imbedded in slimes (clay like substances). In order to obtain a phosphate rock which is useful for the subsequent production of products such as superphosphate and phosphoric acid, it is desirable to remove substantially all the nonphosphatic material from the matrix.

The prior art disclosed numerous processes and means which have been developed to a very high degree and which may be used to obtain a phosphate rock that is reasonably free of slimes and silica. Basically, most all of these processes utilize a complex system of screening and surface washing means which are used in conjunction with agglomeration and flotation steps which serve to further increase the efficiency of the recovery process.

In order to operate a truly efficient recovery process it is generally found that the matrix material, which is initially dug from the ground, must be first disintegrated to as high an extent as possible. Normally, to disintegrate the matrix it is slurried with water and then subjected to a series of screening, abrasion and washing steps. These disintegrating steps serve to break down most of the matrix and permit the subsequent removal of sand and slimes through the use of conventional phosphate recovery processes. Conventional recovery processes normally involve firstly screening the disintegrated matrix to recover the large phosphate rock particles. And secondly, subjecting the fine material which passes through the initial screening step to flotation and agglomeration processes to recover small and intermediate size phosphate particles. The operating efficiency of a recovery process is largely dependent on the removal of substantially all adhering and intermeshed slimes from the phosphate rock. Furthermore, slimes which appear as "mud balls" must first be removed from the material in that "mud balls" which consist primarily of undisintegrated clay matrix will carry through to the subsequent processing steps as would pieces of phosphate rock having substantially the same size. A thorough and efficient disintegration of these "mud balls" has always presented a serious problem in the phosphate recovery industry in that only through long and expensive surface washing may "mud balls" be thoroughly disintegrated.

It is therefore an object of the present invention to provide an improved method for beneficiating phosphate ores.

It is another object to provide an apparatus which may be used to efficiently disintegrate a phosphatic matrix into its primary components.

It is a further object to provide an apparatus which may be used to prepare a phosphatic matrix for subsequent treatment in a phosphate recovery process.

These and still further objects of the present invention will become readily apparent to one skilled in the art from the following detailed description.

In general, the present invention contemplates an apparatus which comprises a series of high pressure liquid jets and means for conducting a phosphate matrix material past said liquid jets whereby the jets strike the matrix material with sufficient force to cause substantial disintegration thereof.

A more clear understanding of the present invention will become readily apparent to one skilled from the following description and drawings wherein.

Figure 1:
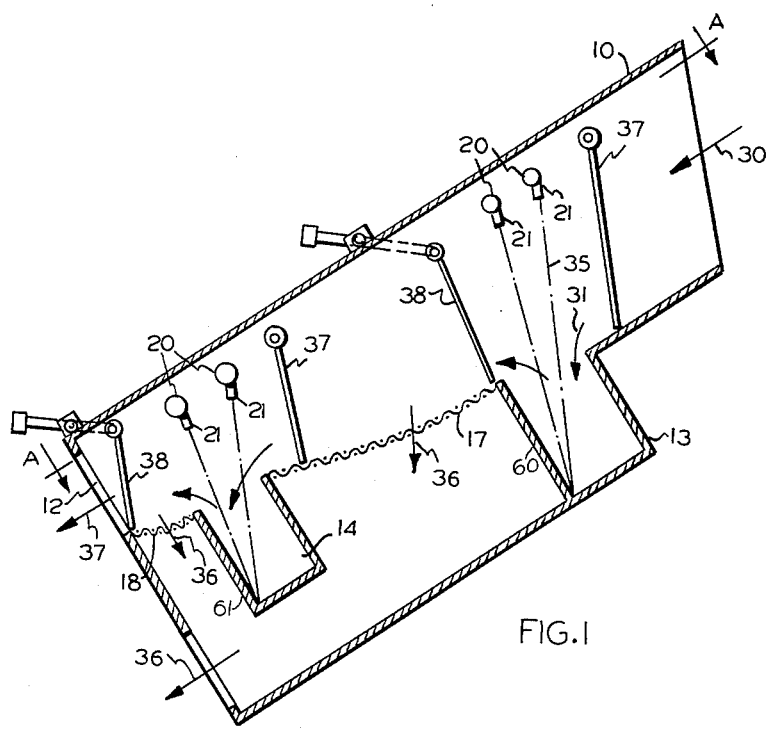
FIGURE 1 is a side cross sectional view of one preferred embodiment of the present invention.
Figure 2:
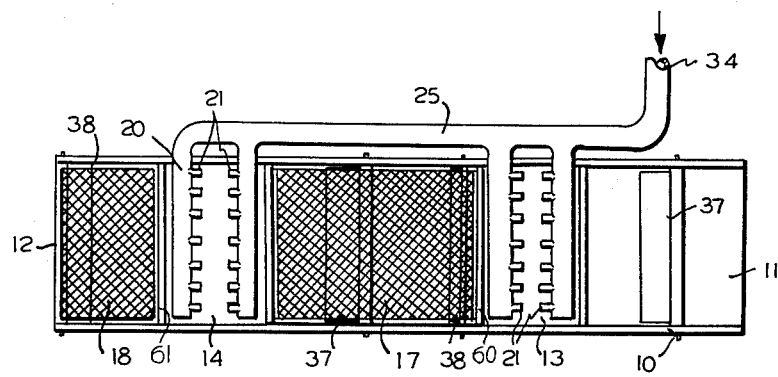
FIGURE 2 is a top cross sectional view of the apparatus shown in FIGURE 1 taken along line A—A.

Referring to FIGURES 1 and 2 it is seen that the first embodiment of the present apparatus comprises an elongated body structure 10 which is provided with a material inlet 11 and outlet 12. Located in the bottom of body 10 are trough depressions 13 and 14. Downstream (which is represented as going from right to left in FIGURES 1 and 2) are located screens 17 and 18 which are mounted in the bottom of body 10 and immediately adjacent the trough depressions 13 and 14 respectively.

In FIGURE 1 it is shown that positioned above each of trough depressions 13 and 14 are two nozzle manifolds 20 each of which are provided with a series of high pressure spray nozzles 21. FIGURE 2 discloses that the spray nozzles 21 located on opposing manifolds 20 are interspaced so that the jet issuing from each does not make contact with this nearest opposing counterpart. The nozzles 21 are located in a manner that permits the jets issuing therefrom to form an interlocking spray pattern that gives effective coverage of the area beneath.

Referring again to FIGURE 2 it is seen that the manifolds 21 are supplied by liquid supply pipe 25. This supply pipe 25 is connected with any suitable pumping apparatus which will supply a desired amount of liquid under pressure in excess of about 800 p.s.i. and preferably on the order of 1,000 to about 2,500 p.s.i. The liquid under pressure will produce a calculable nozzle velocity as it is issued from the spray nozzles. A pressure of 800 p.s.i. will produce a nozzle velocity of about 342 ft./sec.

In FIGURE 1 it is shown that immediately in front of trough depressions 13 and 14 are located manifold actuator gates 37 which serve to sense the height of matrix material passing through the apparatus. These actuator gates 37 are connected by appopriate intermediate linkages (not shown) which regulate the height of nozzle manifolds 20 with respect to the material load. Located behind trough depressions 13 and 14 are load retaining gates 38 which are counter weighted in proper position to retard the flow of matrix material through the system.

In operation, it is seen that slurried phosphate matrix material containing from about 20 to about 80% by weight solids enters the apparatus through the inlet 11 as indicated by arrow 30. Preferably the apparatus is canted in a downhill direction from right to left as shown in FIGURE 1 so that the matrix material moves by gravity from the opening 11 to the first trough depression 13 as indicated by arrow 31. When the matrix material reaches trough 13 it is delayed in its route momentarily by baffle 60 which forms the lower wall of trough 13 and high pressure water in excess of 800 p.s.i., which enters supply pipe 25 as shown by arrow 36, is played upon the matrix material. Jets of water 35 which strike the matrix material temporarily lodge against baffle 60 in trough 13 in the direction of matrix material travel through structure 10 effectively and completely breaks the material into its basic components—namely, phosphate rock, slimes and sand.

After passing out of trough 13 the disintegrated matrix material passes over screen 17 whereupon fine material below about 14 mesh passes from the system as indicated by arrow 36. This fine material comprises sand, slimes and phosphatic rock of small dimension. The coarse material which passes over screen 17 is subjected to further disintegration treatment, similar to that effected in trough 13, in trough 14 of which baffle 61 forms the lower wall. After passing from trough 14 the disintegrated material passes over screen 18 where the remaining fine material is removed from the stream. Subsequent to passing through the second disintegration step at trough 14, the material passes through outlet 12 as indicated by arrow 37. This material (generally called washer rock) is substantially free of "mud balls" and does not contain residual foreign material which normally adhere to the surface and interstices of the phosphate rock. The fine material which passes through screens 17 and 18 may be sent directly to flotation and agglomeration systems where effective and efficient phosphate recovery may be obtained due to the fact the thoroughly disintegrated material is substantially free of "mud balls" and adhering slime.

Figure 3:
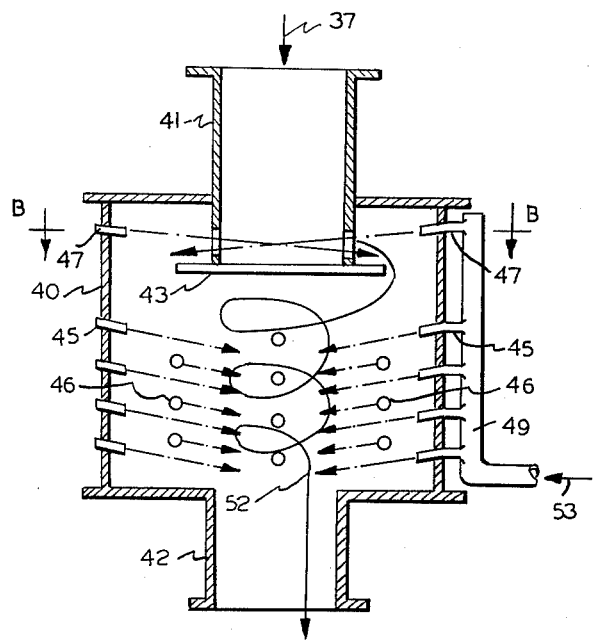
FIGURE 3 is a side cross sectional view of a second preferred embodiment of the invention.
Figure 4:
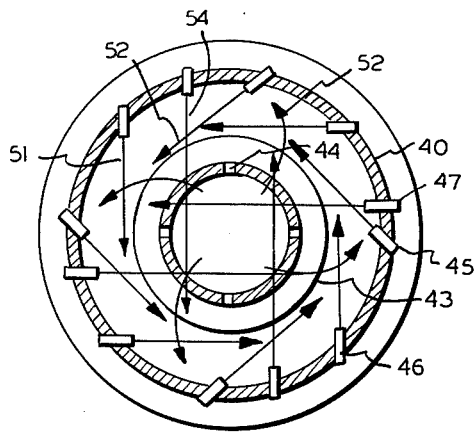
FIGURE 4 is a top cross sectional view of the apparatus of FIGURE 3 taken along line B—B.

A slightly different embodiment of the invention is illustrated in FIGURES 3 and 4 wherein 40 is a washer body of generally cylindrical shape. Washer body 40 is provided with a top mounted inlet 41 and bottom mounted outlet 42. A circular baffle plate 43 is positioned immediately below outlet 41 by support members 44 and serves the function of directing incoming material outwardly towards the walls of body 40. Located in the walls of body 40 are a plurality of primary treatment nozzles arranged in two rows 45 and 46 which are directed semi-tangentially into the interior of body 40. An additional set of 4 purge nozzles 47 are directed to play upon the surface of baffle plate 43 and between suspension members 44. These purge nozzles 47 serve the function of directing matrix material entering the apparatus through inlet 41 and between suspension members 44 toward the outer walls thereof.

Nozzles 45, 46 and 47 as shown in FIGURE 1 are connected to a nozzle manifold 48 which is supplied by liquid pipe 49. The nozzles 47 as illustrated in FIGURE 4 are so directed that jet streams 50 issuing from closely adjacent rows of nozzles 45 and 46 intercept. However, it is seen in FIGURE 1 that the nozzles in two closely adjacent rows are separated between each other and hence the jets issuing from each row do not actually contact each other but form an interlocking network of high pressure jet streams.

In operation, matrix feed is introduced into the apparatus of FIGURES 3 and 4 by way of inlet 41 as indicated by arrow 51 whereupon it is directed towards the outer walls of washer body 40 by way of baffle plate 43 and the action of nozzles 47 which receive water under pressure from supply pipe 49 as shown by arrow 53. The matrix material passing over the edge of baffle plate 43 is immediately taken up by action of high pressure jet streams 50 which impart a spiral motion to the matrix feed through the apparatus in a downward direction around a vertical axis as indicated by arrow 51.

As the material spirals down the interior of the apparatus it is repeatedly struck with succeeding high pressure jets of water. The semi-tangential angle (about 45° inward from a true tangent) of the water jets issuing from nozzles 45 and 46 serves to both impart a spiraling motion to the matrix feed and also to maintain the bulk of the feed away from the sides of the apparatus. Furthermore, the spiral motion imparted to the feed causes a high degree of turbulence within the apparatus which increases to contacting efficiency. The extended spiral path taken by the matrix material also maintains the feed in the apparatus for a sufficient time to affect a high degree of disintegration and washing.

After the matrix material passes through the apparatus shown in FIGURES 3 and 4, the clay of mud balls which are almost invariably present in the incoming feed are substantially disintegrated. Furthermore, all adhering slime and foreign matter which were initially present on the phosphate rock are removed. Thus the material passing from the present apparatus is immediately available for classification and conventional flotation and agglomeration techniques.

From the above description it is seen that the presently intended apparatus may be utilized to disintegrate phosphate matrix in an efficient manner. Furthermore, it should be understood that other matrix type mineral ores may be treated in the herein contemplated apparatus with equally effective results.

We claim:

1. An apparatus for treating a matrix material to separate at least one component therefrom which comprises, a confined chamber through which said matrix material is passed to be treated, inlet means for introducing downwardly said matrix material into the upper end of said confined chamber, outlet means from said confined chamber for treated matrix material, said outlet means being located at a point below said inlet means, a plurality of jet nozzles within said confined chamber disposed between said inlet means and outlet means for subjecting said matrix material in said chamber to high velocity jets of liquid having a nozzle velocity in excess of 342 ft./sec., said jet nozzles being directed to contact said matrix material passing through said confined chamber with jets of liquid issuing therefrom in the direction of said passage of said matrix material therethrough, baffle means, said baffle means being disposed to oppose on its upper surface the direction of matrix flow by gravity through said chamber whereby said matrix material introduced into said chamber during its movement through said chamber is directed by said baffle means into the path of and into contact with said jets of liquid, at least a portion of said plurality of said jet nozzles being disposed and directed to contact said matrix material with jets of liquid on said upper surface of said baffle means.

2. The apparatus according to claim 1 wherein said chamber has positioned in the bottom thereof a trough depression with the length of said trough depression disposed transverse the direction of flow of matrix material through said chamber, the side of said trough depression removed from said inlet means to said chamber providing said baffle means, and said plurality of high pressure liquid nozzles are positioned above said depression.

3. The apparatus of claim 2 wherein said plurality of jet nozzles are arranged in two rows and said two rows of nozzles are directed towards said depression in a manner that permits jets issuing therefrom to cross without impinging on each other.

4. An apparatus for treating a matrix material to separate at least one component therefrom which comprises, a confined chamber through which said matrix material is passed to be treated, inlet means for continuously introducing downwardly said matrix material into the upper end of said confined chamber, outlet means from said confined chamber for treated matrix material, said outlet means being located at a point below said inlet means, a plurality of jet nozzles within said confined chamber disposed between said inlet means and outlet means for subjecting said matrix material in said chamber to high velocity jets of liquid having a nozzle velocity in excess of 342 ft./sec., said jet nozzles being directed for introducing said jets of liquid into said confined chamber in a tangential manner to contact said matrix material in the direction of matrix flow through said chamber whereby said matrix material is passed downwardly through said chamber in a spiral path around a vertical axis, baffle means, said baffle means being disposed within said chamber between said inlet means and a portion of said plurality of said jet nozzles to oppose on its upper surface the gravitational flow of said matrix material through said chamber, whereby said matrix material introduced into said chamber is directed by said baffle means into the path of and into contact with jets of liquid issuing from at least a portion of said plurality of jet nozzles.

5. The apparatus of claim 4 wherein said nozzles are mounted in substantially vertical pairs of rows along the wall of said chamber, the nozzles of said vertical rows being so positioned to effect an interlocking fluid jet pattern within said chamber.

6. The apparatus of claim 4 wherein said nozzles are directed at an angle into the center of said chamber equal to about 45 degrees from a tangent to said chamber wall.

7. The apparatus of claim 4 wherein at least a portion of said plurality of said jet nozzles is directed at the upper surface of said baffle means to direct matrix material in contact with said upper surface of said baffle means outwardly toward the walls of said chamber.

References Cited by the Examiner

UNITED STATES PATENTS

| | | | |
|---|---|---|---|
| 1,157,092 | 10/15 | Du Rell | 241—39 |
| 2,612,889 | 10/52 | Heyman. | |
| 2,916,216 | 12/59 | Altmann et al. | 241—79 XR |
| 2,948,481 | 8/60 | Daman | 241—41 |

J. SPENCER OVERHOLSER, *Primary Examiner.*

ROBERT A. O'LEARY, *Examiner.*